March 13, 1962 K. E. PERRY 3,025,503

INFORMATION STORAGE RECORD AND APPARATUS

Filed Aug. 1, 1956 7 Sheets-Sheet 1

INVENTOR.
KENNETH E. PERRY
BY Henry L. Hanson
ATTORNEY

March 13, 1962 K. E. PERRY 3,025,503

INFORMATION STORAGE RECORD AND APPARATUS

Filed Aug. 1, 1956 7 Sheets-Sheet 2

INVENTOR.
KENNETH E. PERRY
BY Henry L. Hanson
ATTORNEY

March 13, 1962 K. E. PERRY 3,025,503

INFORMATION STORAGE RECORD AND APPARATUS

Filed Aug. 1, 1956 7 Sheets-Sheet 3

INVENTOR.
KENNETH E. PERRY
BY Henry L. Hanson
ATTORNEY

INVENTOR.
KENNETH E. PERRY
BY Henry L. Hanson
ATTORNEY

March 13, 1962 K. E. PERRY 3,025,503

INFORMATION STORAGE RECORD AND APPARATUS

Filed Aug. 1, 1956 7 Sheets-Sheet 5

INVENTOR.
KENNETH E. PERRY
BY Henry L. Hanson
ATTORNEY

INVENTOR.
KENNETH E. PERRY
BY Henry L. Hanson
ATTORNEY

March 13, 1962 K. E. PERRY 3,025,503

INFORMATION STORAGE RECORD AND APPARATUS

Filed Aug. 1, 1956 7 Sheets-Sheet 7

INVENTOR.
KENNETH E. PERRY
BY Henry L. Hanson
ATTORNEY

United States Patent Office 3,025,503

Patented Mar. 13, 1962

3,025,503

INFORMATION STORAGE RECORD AND APPARATUS

Kenneth E. Perry, Newton, Mass., assignor, by mesne assignments, to Minneapolis-Honeywell Regulator Company, a corporation of Delaware Filed Aug. 1, 1956, Ser. No. 601,400

9 Claims. (Cl. 340—174.1)

A general object of the present invention is to provide a new and improved binary information record and a new and improved apparatus and method for producing and utilizing the record. More specifically, the invention comprises a new and improved storage record for binary data which is characterized by its efficient use of record space in combination with means for producing and utilizing the record when it has been produced. In addition, the invention comprises a new type method and apparatus for minimizing the time required for transmitting binary data and which further minimizes the effects of noise in the associated circuitry.

The information used in data processing machines, telegraph systems and the like is frequently in some form of binary notation due to the ease with which circuit components may be built to handle "on" and "off" information representing binary "ones" and "zeroes." In data processing machines and the like, the storing of information is frequently required in some storage medium such as a tape which is punched or marked, or a magnetic tape. Efficient use of the storage medium is essential from the economic standpoint as well as from the speed at which the information can be stored, read back, and transferred for use in the associated data processing apparatus.

In many forms of circuits utilizing binary data, the data is transferred to the record medium for recording by way of a shift register or similar apparatus and recorded serially along the length of the record in some form to indicate binary "ones" and "zeroes." In some types of apparatus, the information in the shift register is shifted to the record a bit at a time in a serial manner in accordance with a signal derived from a synchronization or sprocket channel signal which has previously been stored on the record medium. Further, the reading of the data from the record is accomplished in a serial manner by passing a suitable reading head over the record on the record medium at the same time a similar reading head is reading signals from a sprocket channel or synchronization channel. The resultant signal is used to control suitable shift register circuitry, the latter containing the data read from the record channel. The use of a synchronization channel on the record medium is expensive in using valuable record space and in addition, the circuitry utilizing such a record is necessarily complex and there is an inherent increase in the possibility of there being an error in the data that is transferred or recorded.

When the record medium has a plurality of record channels recorded thereon in parallel along the length of the medium, the effective use of a synchronizing channel on the record, where there is a synchronization pulse for each bit, requires that each bit of the binary data in each channel be lined up across the record tape with extreme accuracy with the synchronization pulse in order to insure that there is proper synchronization between the data read onto or read out of the tape. With wide tapes, the perfect alignment of the tape with respect to the reading head is extremely difficult to achieve, and under conditions of field or commercial use, outside of a laboratory, the use of a synchronizing channel on a multiple record tape is not practical.

The present invention has for one of its further objects the formation and use of a binary data record which eliminates the necessity or need for a synchronization or sprocket channel on the record medium when the data is being transferred to or from the record.

The foregoing object of the present invention is achieved by a novel data storage record formed so that each channel recorded thereon is self-synchronizing and is thereby substantially independent of any record skew or improper alignment when the record tape is passed under a reading head. This storage record is formed by a plurality of spaced record marks or indicia on the record medium. Each mark or indicium is common to two adjacent binary bits which are recorded and the spacing between adjacent indicia is indicative of whether a binary "one" or "zero" has been recorded. In other words, each binary bit is formed by two selectively spaced record indicia where the spacing is indicative of a binary "one" or "zero." When the record medium is moved past a recording station at a constant speed, it is possible to produce time spaced output signals which are representative of the recorded data. These time spaced signals appear as a sine wave of a first or second frequency and are readily adapted for conversion into time spaced pulses which may be used to control the associated shift register circuits without the necessity of additional outside signal pulses.

The formation of the record indicia in this way permits for greater time efficiency in information transfers as all of the record space in any one channel is useful space. This is to be contrasted with a dot-dash notation where a certain amount of dead space is present between each information bit.

It is accordingly a more specific object of the present invention to provide a new and improved binary data storage record comprised of a plurality of serially recorded record indicia where each indicium is common to adjacent binary digits and the spacing between adjacent indicia is indicative of either a binary "one" or "zero."

Another more specific object of the present invention is to provide a new and improved apparatus for producing a data storage record comprising a recording means for storing on said record a plurality of record indicia where the spacing between successive adjacent pulses is indicative of binary data.

Still another object of the present invention is to provide an apparatus for increasing the time efficiency of information transferred between two points.

A further more specific object of the present invention is to provide a new and improved method of recording binary digits on a recording medium which comprises the forming of a plurality of record indicia on the recording medium where each indicium forms a reference indicator for two binary digits and the spacing between adjacent indicia is selected so that it is indicative of a selected binary digit.

A still further more specific object of the present invention is to provide a new and improved apparatus for utilizing a self-synchronous record indicia on a storage record for producing a pulse for controlling a shift register associated with the apparatus.

Another important feature of the present invention lies in the use of a magnetic recording system wherein the signals are recorded so that on playback the resultant electrical signal will have one crossover on the zero axis representative of one bit of information, except for the end bit in a series. This crossover may be in either direction. Since the crossover is the only part of the signal used, the remaining portion of the signal may take wide swings from zero so that the presence of small noise signals will not be sensed. Further, amplitude variations in the recorded signal will not affect the reliability of the resultant data read from the tape when a magnetic tape is used. This further overcomes difficulties and complications encountered in systems using gates to cut down noise problems without any sacrifice of signal accuracy and reliability.

Still another object of the invention is to provide a signal recording system of the magnetic type wherein the playback signal zero crossovers are used to indicate bits of information regardless of the phase or direction of the crossover.

The various features of novelty which characterize the invention are pointed out with particularity in the claims annexed to and forming a part of the present specification. For a better understanding of the invention, its advantages, and specific objects attained with its use, reference should be had to the accompanying drawings and descriptive matter in which there is illustrated and described a preferred embodiment of the invention.

Figure 1:
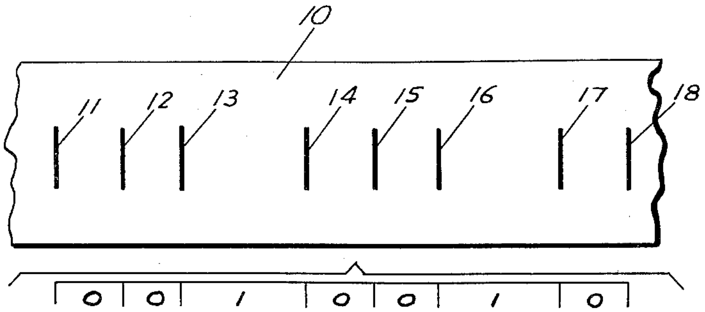
FIGURE 1 shows a record medium having thereon a plurality of spaced record indicia in accordance with the principles of the present invention.

Referring first to FIGURE 1, the numeral 10 represents a record medium on which binary information in the form of "ones" and "zeroes" has been recorded. The record medium may obviously take many forms such as a paper tape having record indicia punched thereon or marked thereon with suitable inks which may be magnetically or photoelectrically read. In addition, the record medium 10 may take the form of a magnetic tape having binary information recorded thereon. In the preferred embodiment of the present invention, the record medium is assumed to be a magnetic tape although the scope of the invention is not intended to be so limited. In FIGURE 1, the marks on the record 10 are identified by the numerals 11 through 18. While the marks are visibly shown in FIGURE 1, in actual practice in the case of a magnetic tape, these marks, while existent at the indicated positions, will actually not be visible in the absence of a specialized chemical treatment of the tape 10.

As shown in FIGURE 1, a series of "zeroes" and "ones" have been recorded in serial fashion as represented by the record indicia 11 through 18. In accordance with the principles of the present invention, each record indicia is used in conjunction with two adjacent binary bits or digits. Further, the distance between the two adjacent indicia is indicative of either a binary zero or a binary one. In the first position shown on the record tape, there are two indicia 11 and 12. The spacing between the indicia 11 and 12 is a preselected distance which is assumed to represent a binary zero. The next two indicia on the record representing a binary digit are the indicia 12 and 13. Again, the spacing between the indicia 12 and 13 is the same as that between indicia 11 and 12. Consequently, the spacing between 12 and 13 is representative again of a binary zero.

The indicia 13 and 14 are separated by a distance which is approximately twice that between the indicia 12 and 13 and this distance is representative of a binary "one."

The indicia 14 and 15, and 15 and 16 are spaced to represent binary zeroes. The spacing between the indicia 16 and 17 is spaced to represent a binary "one." Similarly, the spacing between the indicia 17 and 18 is such as to represent a binary "zero."

It will be apparent in FIGURE 1 that the record track shown on the record 10 has utilized the record indicia so that each indicia is used with two adjacent binary digits and the spacing between adjacent indicia is indicative of a binary "one" or binary "zero." The information is arranged on the record track on the record medium so that all of the space along the record track is used in the indicating of the stored binary information. Consequently the information per unit length may be considerably increased over present known records wherein separate characters are placed on the record with the size of the character being representative of the information and the characters being each separated by an unused record space.

Figure 2:
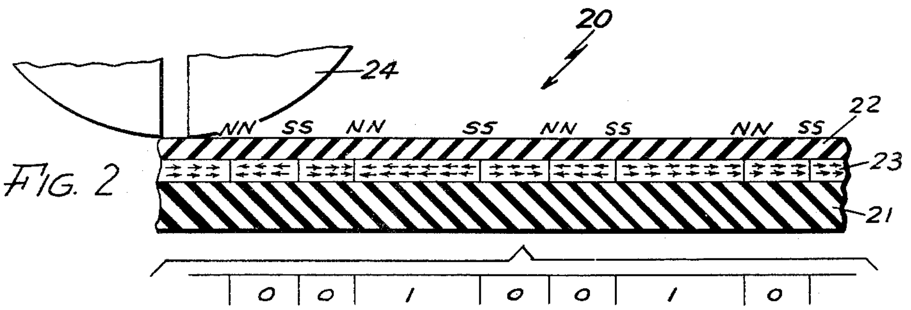
FIGURE 2 shows a magnetic tape which is adapted to be used in accordance with the principles of the present invention.
Figure 3:
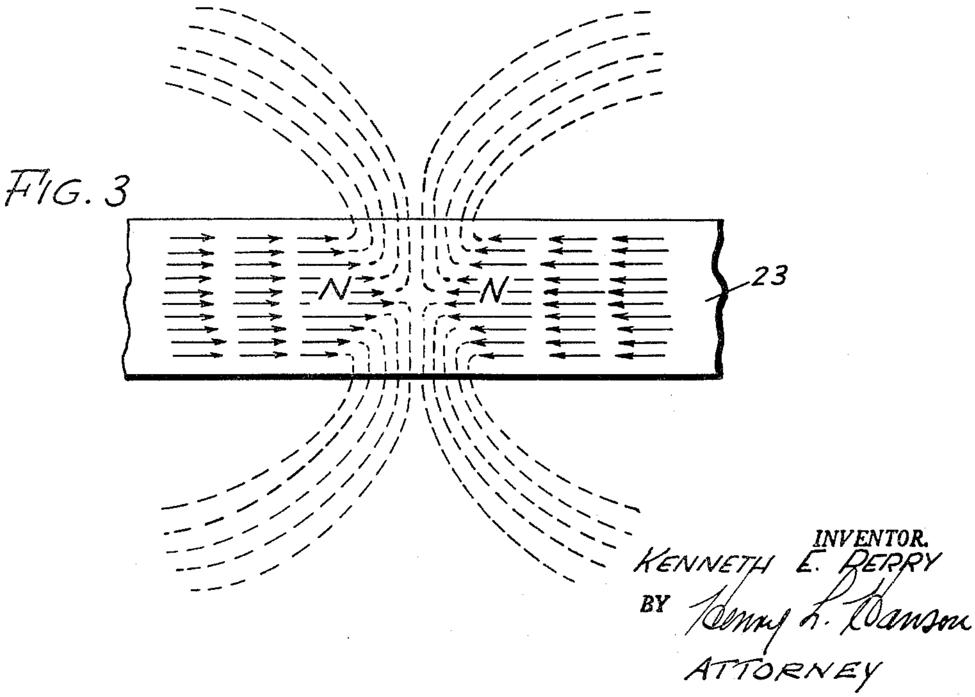
FIGURE 3 shows an enlarged view of a single magnetic indicium of the type found in FIGURE 2.

FIGURES 2 and 3 show representative record characteristics of a magnetic tape which has been recorded in accordance with the principles of the present invention. In FIGURE 2 a magnetic tape 20 is shown and this magnetic tape comprises a "Mylar" base member 21, a second "Mylar" protective covering 22 having a layer of magnetic material 23 sandwiched between. The magnetic material may well be magnetite or some other type of iron oxide well known in the magnetic recording art. The magnetic record 20 is adapted for relative movement with respect to a recording head 24 of well known type shown in partial section only in FIGURE 2. As the record 20 is passed under the head 24, the electrical signals applied to the head are adapted to polarize the magnetite first in one direction and then in the other so as to form in the magnetite a series of magnetic poles whose length is indicative of the binary information which has been recorded. The polarization is accomplished by applying to the recording head energizing circuit a suitable signal which will line up the magnetic particles in the magnetite. These polarizations may be reversed by reversing the electrical signal applied to the recording head 24. Each time the signal to the recording head is reversed, the direction of the polarization will reverse so that at each reversal point, there will be a pair of north poles or a pair of south poles insofar as the resultant polarization is concerned.

As shown in FIGURE 3, where there are adjacent north poles in the magnetite, the flux lines are in opposition and tend to rise out of the surface of the magnetite to form a record indicia. While not visible, when such an indicia is passed under a reading head, such as the head 24, there will be a rapid change of flux at the particular pole junction point and a pronounced voltage will be induced in the electrical circuit associated with the reading head. The actual wave forms induced in the reading head circuit are discussed in greater detail in FIGURES 7 and 8.

With the adjacent poles formed by the magnetizing process producing magnetic indicia, it will be apparent from the arrangement of the polarized sections shown in FIGURE 2 that a plurality of zeros and ones may be readily recorded in the magnetic tape. As with FIGURE 1, the distance between the magnetic indicia, or the adjacent like polarized pole ends, will define whether or not a zero or a one has been recorded.

Figure 4:
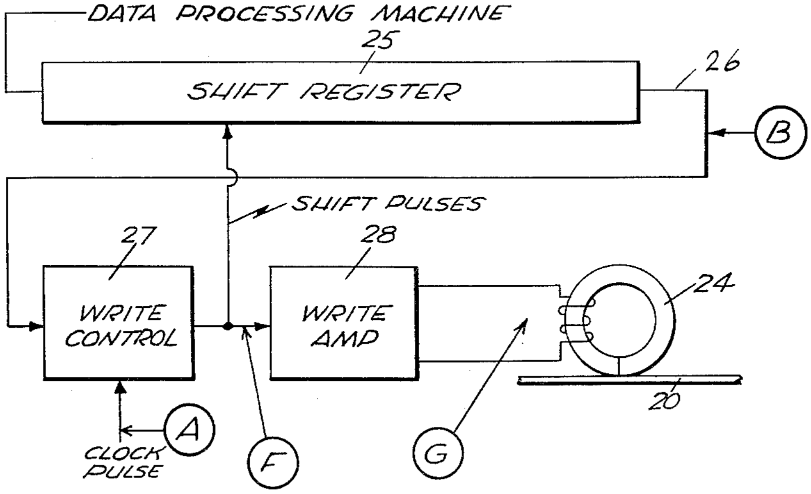
FIGURE 4 is a diagrammatic showing of the apparatus essential to producing a magnetic record of the type shown in FIGURE 2.

Referring now to FIGURE 4, there is here shown a representative form of an apparatus usable for recording, on a magnetic tape, binary information which has been supplied thereto by a suitable data processing machine. The associated data processing machine may obviously take many forms such as an electrical computer, a telephone central exchange, or a telegraph center. The data which is to be recorded is presumed to be a series of binary "zeroes" and "ones." The data to be processed is shown coming into a shift register 25 where the binary information is to be shifted along serially preparatory to its application to the read-write head 24 which is cooperating with the tape 20. A typical shift register usable in the diagrammatic combination shown in FIGURE 4 is a magnetic shift register using a plurality of saturable magnetic cores each having a substantially rectangular hysteresis characteristic. This type of magnetic shift register may well take the form of the register described in an article entitled "Magnetic Shift Registers Using One Core Per Bit," by R. D. Kodis et al., disclosed in the 1953 I.R.E. Convention Record, Part IV, "Electronic Computers," pages 38–42. In this type of register, the only information that is actually transferred along the register is either a binary "one" or a binary "zero." Insofar as the present description is concerned, when no signal is read out of a particular core when a shift pulse is applied thereto, it is assumed that this particular core has a binary "zero" stored therein and consequently there is no signal transferred to the next core which will, after the application of a shift pulse thereto have a "zero" stored therein. Consequently, the only information coming out of the end of the shift register at the output lead 26 will be binary "ones," the lack of information indicating a binary "zero."

As the output of the shift register will have only binary "ones," it is essential that a binary "zero" signal be developed in the circuit and that this binary "zero" signal be included in the information which is recorded on the magnetic tape 20. For this purpose, there is provided a write control circuit 27 having the output of the shift register applied thereto as well as a clock pulse signal. This clock pulse signal is adapted to supply a plurality of continuous clock pulses each spaced by a predetermined time interval.

Figure 5:
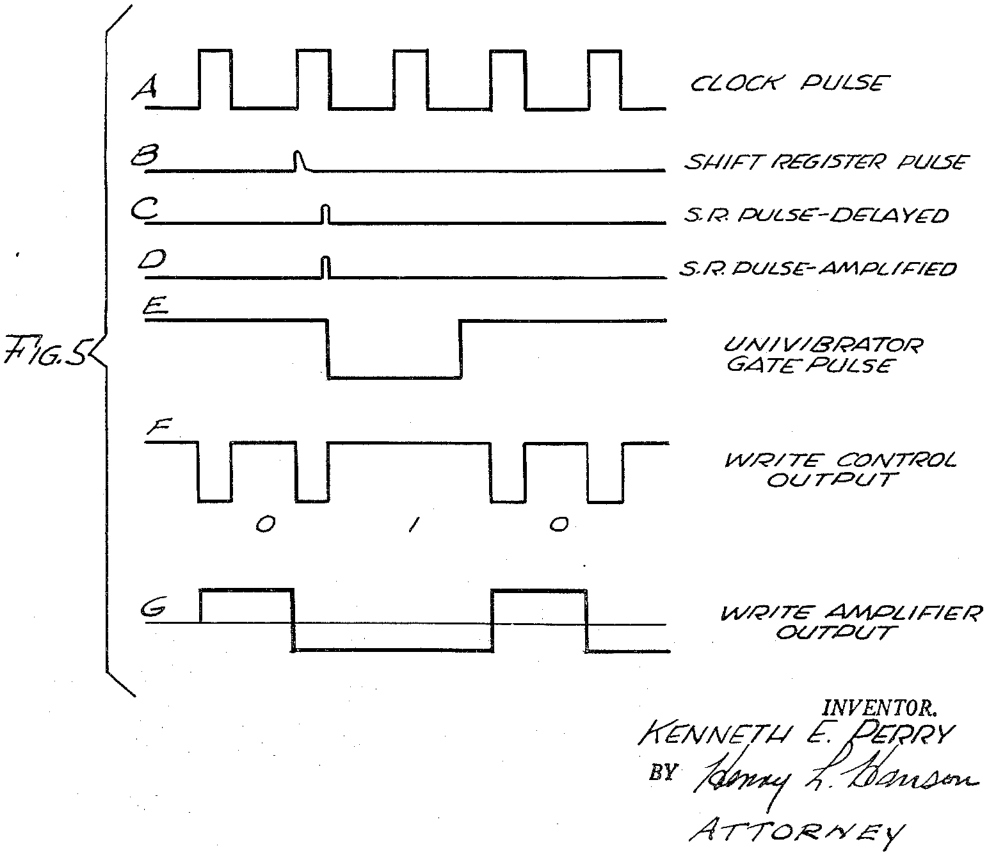
FIGURE 5 shows the wave form associated with the apparatus described in FIGURE 4 as well as in FIGURE 6.

The clock pulses used in conjunction with the write control circuit 27 are shown in FIGURE 5A. These clock pulses will normally be passed directly to the output of the write control circuit 27 through a special amplifier 28 to the energizing coil on magnetic recording head 24.

The output of the write control amplifier will be as shown in FIGURE 5F. As soon as a "one" is received from the shift register on the input of the write control circuit 27, this "one" will be effective to inhibit or block out the next clock pulse. As a result, the spacing between the output pulses on the output of the write control circuit will be substantially twice as great as when a "zero" has been indicated by adjacent clock pulses.

Each of the pulses on the output of the write control circuit 27, as shown in FIGURE 5F, are applied to the write amplifier circuit 28, and also applied as shift pulses to the shift register 25. It will be noted that there is a single shift pulse for each binary digit handled by the circuit and while the timing on the shift pulses is not uniform, this does not interfere with the proper operation of the shift register 25.

The write control circuit output pulses of FIGURE 5F, when fed into the write amplifier circuit 28 are converted to a square wave signal where each pulse of the write control output circuit is used to produce a signal reversal each time that a pulse occurs. This signal reversal will result in the square wave output shown in FIGURE 5G which indicates that a binary "zero" will be a square wave of a first time duration and that a binary "one" will be a square wave pulse of a second time duration and of opposite polarity. This binary information is alternately applied to the energizing coil on the read-write head 24. The application of the write amplifier output signal shown in FIGURE 5G to the read-write head 24 will result in the recording on the magnetic tape 20 of a signal of the type shown in FIGURE 2.

Figure 6:
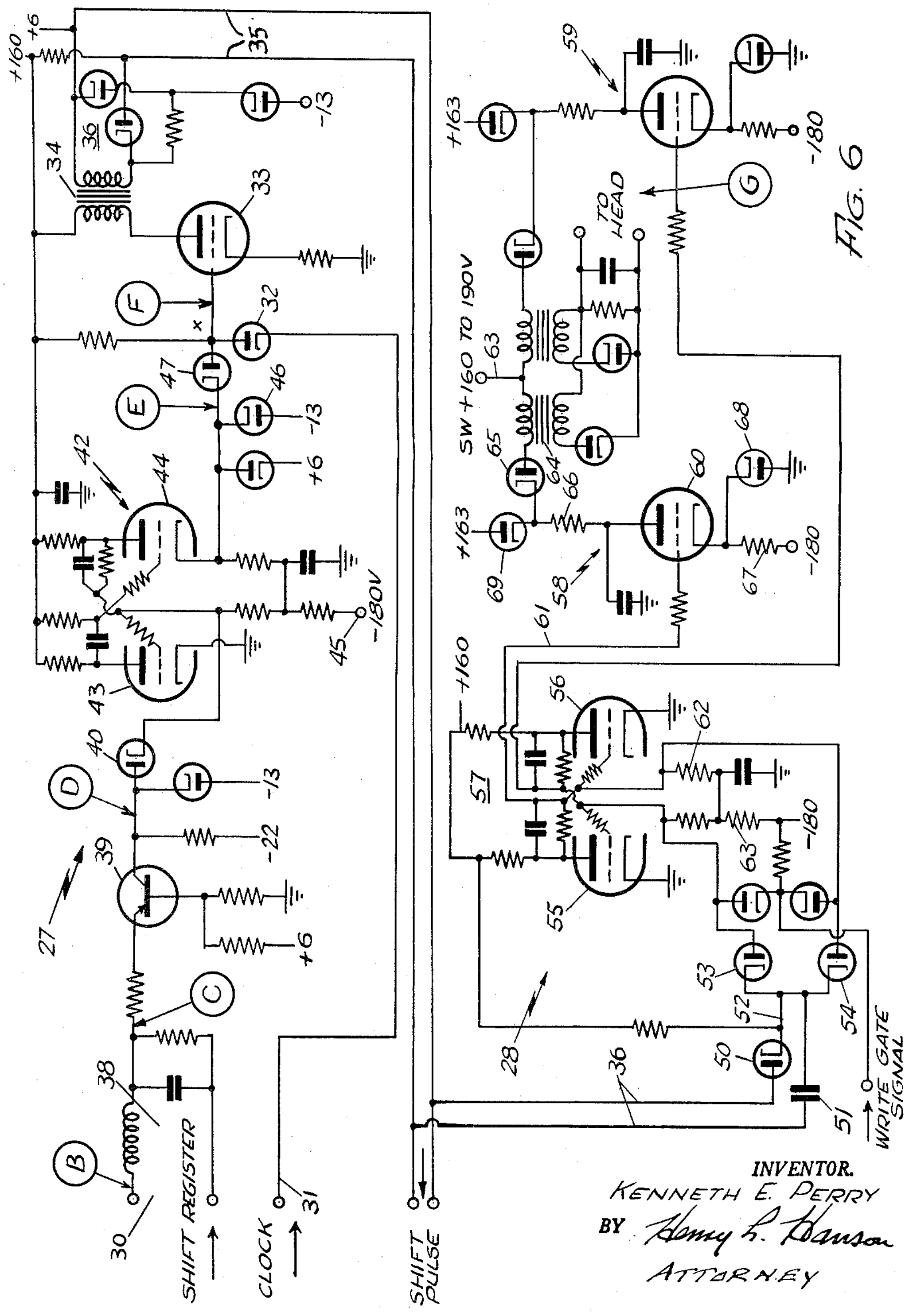
FIGURE 6 shows a schematic circuit for a write control circuit and amplifier of the type shown in FIGURE 4.

FIGURE 6 shows the fundamental circuitry involved in the write control circuit 27 and the write amplifier 28. The write control circuit 27 has two input circuits 30 and 31; the first input circuit 30 being supplied by the shift register 25 and the second input circuit 31 being supplied with clock pulses of the type shown in FIGURE 5A. The clock pulses on the input 31 are coupled directly by way of a diode 32 to the input control electrode of an amplifier device 33. The output of the amplifier device 33 is coupled by way of a transformer 34 to an output circuit 35. The pulses on the output circuit 35 will be suitably clamped and clipped by the biased diode circuitry 36 shown in the output of the transformer 34. The pulses on the output leads 35 will be applied to the input circuit 36 of the write amplifier 28 and will also be applied as a shift pulse for the shift register 25. As soon as a shift pulse occurs, the shift register will advance and if there is a binary digit stored in the last position of the shift register, it will be shifted out into the input terminals 30 of the write control circuit 27. If a pulse is shifted out of the shift register into the input terminals 30, this pulse will be as shown in FIGURE 5B. The pulse will be applied to a delay network 38 so that the output of the delay network will be as shown in FIGURE 5C. This shift register pulse will be amplified by the transistor amplifier 39 and applied by way of the diode 40 to the input of a univibrator or monostable multivibrator 42. This univibrator is characterized by its ability to switch from its stable state into an unstable state for a predetermined length of time dependent upon the time constants of the circuit and then switch back to the stable state at which state it will remain until a subsequent pulse is received.

More specifically, the univibrator 42 incorporates a pair of amplifier devices 43 and 44. The control electrode of the amplifier device 43 is normally biased to cut off due to the connection to a minus 180 volt power supply terminal 45. With the amplifier device 43 cut off, the amplifier device 44 will be conducting. As soon as the positive pulse is received by way of the diode 40 and applied to the input control electrode of the amplifier device 43, this device will be rendered conductive and when rendered conductive, a signal from the anode of the device 43 will be applied to the control electrode of the device 44 to cut this device off. When the amplifier device 44 has been cut off, the potential of the cathode will drop to a minus 13 volts due to the connection of the cathode to a minus 13 volt power supply by way of the diode 46. This negative signal will then be applied by way of the diode 47 to the input control electrode 33 and will override the clock pulse signal being passed to the input of the amplifier device 33 through the diode 32. In other words, the output of the univibrator 42, when negative, will prevent the application of a clock pulse to the input of the amplifier device 33.

After a predetermined time delay, the univibrator 42 will be pulled back to its stable state due to the bias source on the input of the device 43 overriding the biased signal from the output of the amplifier device 44. The time that it takes for this univibrator to switch back will be dependent upon the RC time constants of the circuit. The output of the univibrator 42 will be as shown at FIGURE 5E where it is shown gating out one of the clock pulses. Since one of the clock pulses has been gated or cancelled out due to the action of the univibrator, the write control output as viewed in the output terminals 35 will take the form shown in FIGURE 5F.

The control signals on the write control circuit output terminals 35 are applied by way of the input terminals 36 to the write amplifier circuit 28. As mentioned above, this write amplifier circuit is adapted to produce pulses whose time length is dependent upon the time spacing between the pulses received from the write control circuit 27. These pulses are applied by way of the diode 50 and condenser 51 to an input lead 52. Lead 52 connects by way of a pair of diodes 53 and 54 to the input control electrodes of a pair of amplifying devices 55 and 56. The amplifying devices 55 and 56 are the amplifying elements of a bi-stable flip-flop circuit 57. The bi-stable flip-flop 57 is adapted to be switched from one stable state to the other stable state whenever an input pulse is received on the input lead 52. The impedance looking into the bi-stable flip-flop 57 is such that when combined with the condenser 51 forms a differentiating network which will differentiate the output pulses received from the write control circuit 27. The resultant differentiated pulses is used to trigger the flip-flop 57 from one stable state to the other. This triggering will take place only when there is a write gate signal present on the input to the flip-flop 57 to open the gating circuit to pass the differentiated signals.

The output from each stage of the bi-stable flip-flop 57 corresponds basically to the wave forms shown in FIGURE 5G. However, in order to produce a signal usable on the recording head energizing coil, this signal is passed through a pair of switching stages 58 and 59. The stage 58 comprises an amplifying device 60 which has its cathode connected to a negative 180 volt power supply and its control electrode connected by way of lead 61 to the input control electrode circuit of the amplifying device 56. When the amplifying device 55 is conducting, the device 56 will be cut off and consequently the potential on the lead 61 will be applied by way of resistor 62 to resistor 63 so that a minus 180 volts will be applied to the control electrode of the device 60 whose cathode will be at substantially ground potential due to the diode 68. Consequently, the device 60 will be cut off. With the amplifying device 60 cut off, the anode of the device 60 will be at approximately 163 volts since the anode is connected to a 163 volt power supply by the diode 69. When it is desired to activate the output switching section 58 or 59 it is necessary that the voltage on supply lead 63 be switched from 160 to 190 volts. When the 190 volts is supplied to lead 63, and a switching pulse is applied to the control electrode of the amplifying device 60, the device 60 will conduct in a circuit that may be traced from the 190 volt power supply lead 63, the primary of transformer 64, diode 65 and resistor 66, amplifying device 60, and resistor 67 to the minus 180 volt power supply terminal. Current will continue to flow in that last traced circuit until such time as a switching operation takes place in the bi-stable flip-flop 57. With the current flowing through the primary of the transformer 64, this current will be induced in the output of the transformer and will be applied to the head 24 by way of the energizing coil wound thereon. The current actually supplied to the head will take an approximately square wave pulse form of the type shown in FIGURE 5G.

When the bi-stable flip-flop 57 switches to the opposite condition, the discharge device 60 will be cut off and the switching section 59 will become active. This switching section is substantially identical in construction to that of the switching section 58 and is adapted when the amplifying device thereof is switched to conduction to produce a corresponding current pulse of opposite polarity in the output of the circuit which leads to the recording head 24. With this circuitry it will be seen that it is possible to record binary data on magnetic tape in the form set forth above in FIGURES 1 and 2.

Figure 7:
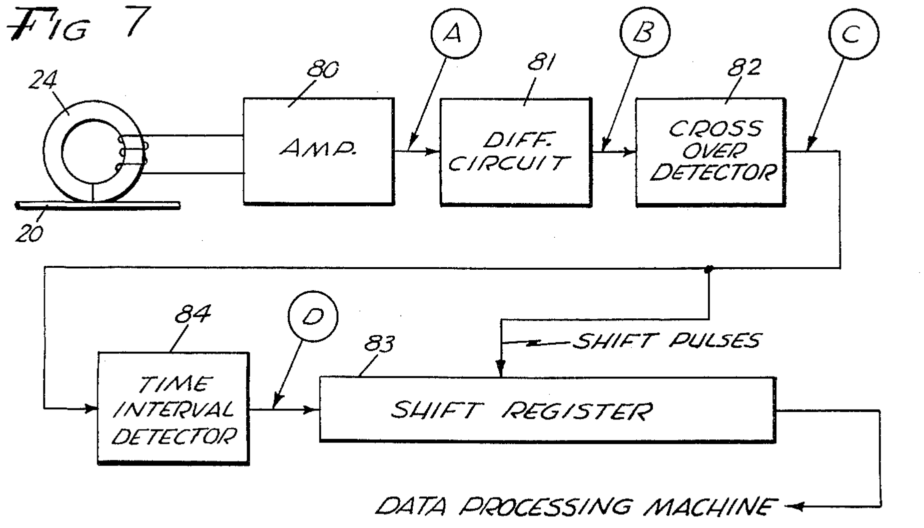
FIGURE 7 shows diagrammatically a circuit for reading and utilizing the magnetic record indicia of the type described in FIGURE 2.

Referring now to FIGURE 7, there is here shown a diagrammatic arrangement for apparatus for utilizing or reading binary data which has been recorded on magnetic tape in the maner shown in FIGURES 1, and 2. In this figure, the magnetic tape described above is passed under a suitable reading head 24 so that the signals therein are converted into electrical voltage pulses in the winding on the reading head 24 and applied to the input of an amplifier 80. The output of the amplifier 80 is fed through an appropriate electrical differentiating circuit 81 and then to a crossover detector circuit 82 which is adapted to produce a plurality of electrical pulses directly indicative of the magnetic indicia on the magnetic tape 20. In addition, the crossover detector has an output signal in the form of an electrical pulse each time a binary bit is received and this pulse is applied to a suitable shift register 83 so that the data will be shifted serially along the length of the shift register in accordance with the number of binary bits received from the magnetic tape 20. A time interval detector is also energized by the crossover detector and this time interval detector measures the time space between successive pulses so as to determine whether or not a binary "zero" or binary "one" has been read from the magnetic tape 20. The time interval detector is adapted to produce an output pulse only when there is a binary "one" present. The output of the shift register is then arranged for connection to a suitable data processing machine.

Figure 8:
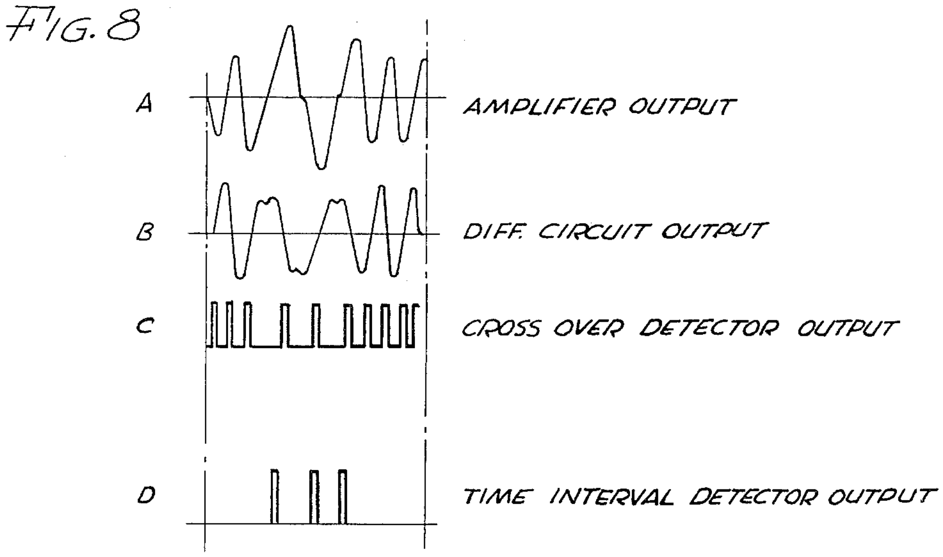
FIGURE 8 shows wave forms associated with the apparatus of FIGURE 7.

The wave forms to be found in the circuit of FIGURE 7 are set forth in FIGURE 8. In FIGURE 8A, the output of the amplifier 80 is shown as a sine wave of a generally irregular shape due to the fact that one binary character is recorded at one frequency and the other binary character is recorded at a second frequency.

FIGURE 8B shows the output of the differentiator circuit. It will be noted that in this wave form that the spacing identity of the "zeroes" and "ones" of the binary information is more clearly detected. In other words, the binary "zeroes" are clearly represented by a sine wave of a first frequency and the binary "ones" are represented by a distorted sine wave at a frequency which is one-half the frequency of the binary "zeroes."

The crossover detector is adapted to modify the wave form shown in FIGURE 8B so that it corresponds to the pulse output shown in FIGURE 8C.

The pulses in the output of the crossover detector as shown in FIGURE 8C are applied to the input of the time interval detector 84 which will have an output representing the existence of binary "ones" in the manner set forth in FIGURE 8D. These binary ones will be shifted along through the shift register 83 to the data processing machine as long as there are shift pulses supplied thereto by the crossover detector 82.

It will thus be seen that from the circuit in FIGURE 7 there is provided a circuit for producing a series of electrical pulses which are characteristic of the binary information recorded on the magnetic tape and that these pulses are used directly to control the shifting of the information in the shift register associated with the data processing machine. It will be apparent that an apparatus of this type does not require any separate external synchronization circuit but derives its own operating signals directly from the information which has been recorded. In other words, each time a binary digit is read from the magnetic tape, there is produced a shift pulse. As the shift pulses will appear only when there are binary digits, it will be apparent that there can be no loss of information due to a lack of tracking in a synchronization or sprocket channel.

Figure 9:
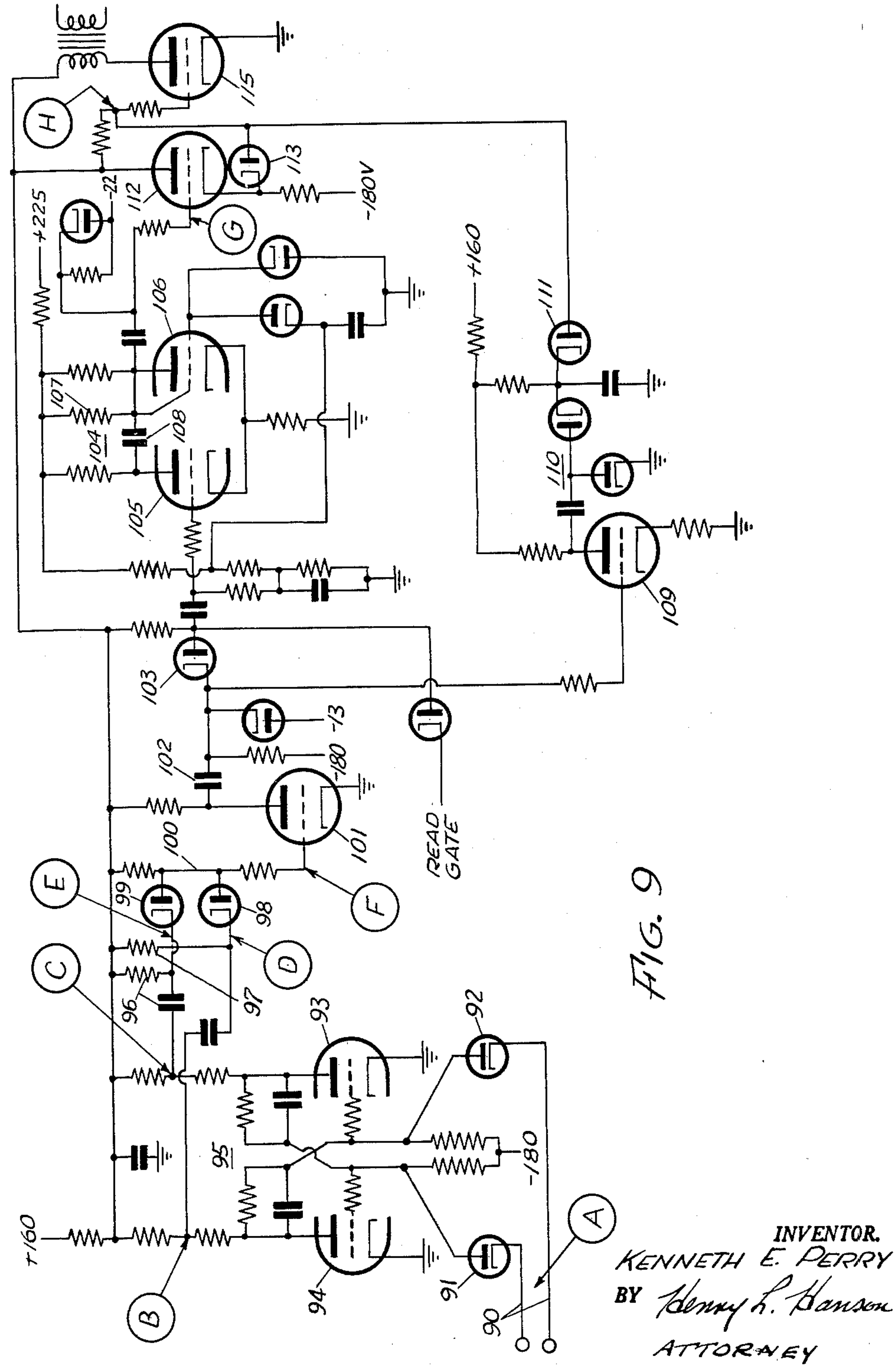
FIGURE 9 shows a schematic circuit of a representative crossover detector of the type used in FIGURE 7.
Figure 10:
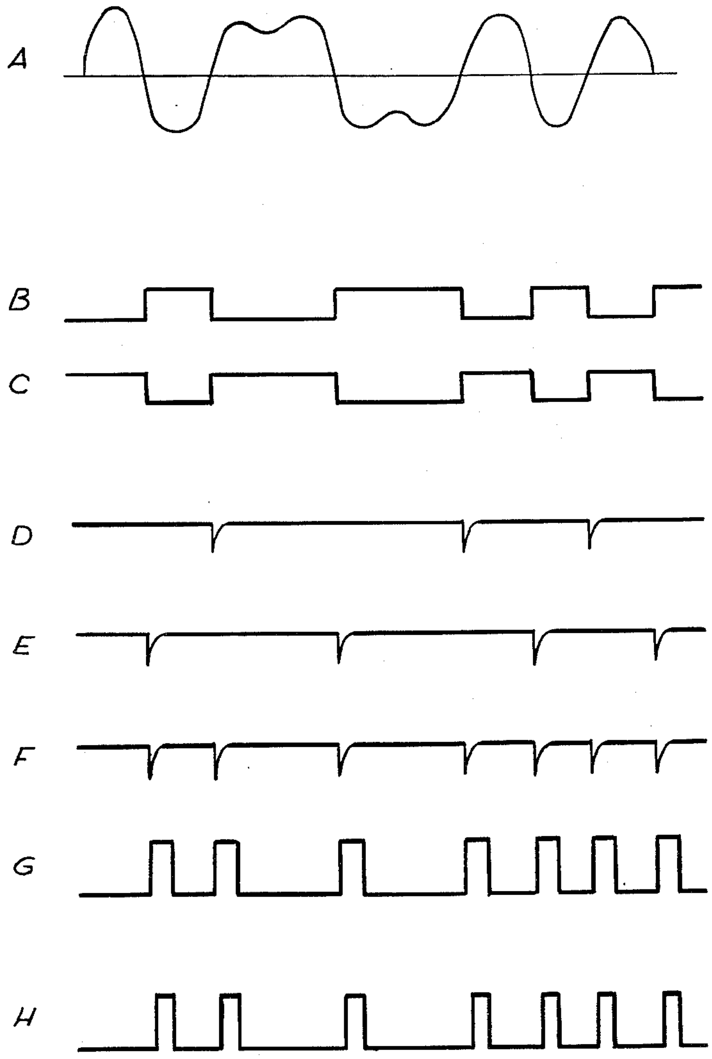
FIGURE 10 shows the wave forms associated with the apparatus in FIGURE 9.

The crossover detector 82 shown in FIGURE 7 is shown in schematic detail in FIGURE 9. The wave forms associated with the crossover detector are shown in FIGURE 10. The crossover detector comprises a pair of input terminals 90 which are connected by way of a pair of diodes 91 and 92 to the inputs of a pair of amplifying devices 93 and 94. Amplifying devices 93 and 94 together with their associated circuitry form a bi-stable multivibrator or flip-flop stage 95. The wave form on the input terminals 90 will be as shown at A in FIGURE 10. This wave form is actually the differentiator circuit output wave form shown in FIGURE 8B. The effect of this wave form on the input of the bi-stable flip-flop 95 is to cause the flip-flop to switch the amplifying devices 93 and 94 alternately between the conducting and non-conducting states. The resultant wave forms on the output of the flip-flop 95 will be as shown at B and C in FIGURE 10. The square wave output from the flip-flop 95 amplifier sections is adapted to be differentiated by a pair of RC circuits 96 and 97. The resultant differentiated output will be as shown in FIGURES D and E of FIGURE 10. The resultant differentiated signals are buffered together by a pair of diodes 98 and 99 on a buffer line 100 and applied to the input of an amplifying device 101. The wave form of the combined differentiated signals is as shown at F in FIGURE 10.

The output of the amplifier 101 is coupled by way of a condenser 102 and diode 103 to the input of a univibrator circuit 104.

The univibrator 104 is characterized by its normally being in a stable state and when triggered switching to an unstable state for a predetermined length of time and then back to the stable state again. Each time a differentiated pulse from amplifier 101 is received on the input of the univibrator 104, there will appear on the output thereof an output square wave pulse as shown at G in FIGURE 10.

Considering the univibrator 104 in greater detail, it will be seen to comprise a pair of amplifying devices 105 and 106. Amplifying device 106 is arranged to normally be conducting due to the connection of the control electrode thereof to the positive power supply terminal by way of the resistor 107. The apparatus will stay in that condition with the device 106 conducting and the device 105 non-conducting until such time as a positive pulse is received from the amplifier device 101. When a positive pulse is received on the input control electrode of the amplifying device 105, this device will conduct and the resultant conduction will throw a negative voltage on the control electrode of the device 106 to cut this device off. The device 106 will remain cut off until such time as the RC circuit formed by resistor 107 and condenser 108 of the univibrator has charged so as to render the device 106 once again conductive. As soon as the device 106 becomes conductive, the device 105 will be cut off.

As the univibrator 104 will not function as a univibrator but rather as an amplifier when a pulse amplitude of less than a predetermined value is received on the input thereof, it is essential that means be provided to eliminate in the output any possibility of any pulse other than the desired one from appearing in the output of the circuit. To eliminate the possibility of an undesired pulse in the output, the differentiated pulse is amplified by the amplifier device 101 and is applied through another circuit which is effective to cancel out the first part of the output from the univibrator. In other words, if a pulse should inadvertently be amplified by the univibrator 104 instead of triggering the univibrator as is required, this pulse will be cancelled from the output by the application of a further pulse which is in opposition. This further pulse will also cut off the first part of the output of the univibrator 104.

This gating pulse is produced by amplifying the differentiated pulse on the output of the amplifier 101 by further amplifier device 109. The output of this device is passed through suitable pulse shaping circuitry 110 which has the effect of clipping the output pulse and limiting it to a predetermined amplitude. The output of the shaper circuit is buffered by way of a diode 111 to the output of the amplifying device 112 whose output is coupled from the cathode thereof by way of diode 113. In other words, the signal buffered through diode 111 is in opposition to the signal of the buffer diode 113 and will cancel that signal so long as it lasts. As the univibrator 104 has an output which is considerably longer than the differentiated pulse duration, the resultant effect will be to cut off the first part of the univibrator output as shown at H in FIGURE 10.

It will be apparent that since only the presence of a zero crossover is used to establish a reference or bit indicia, the remaining portion of the signal is of little importance. This minimizes the effects of any noise that may be present in the reading and amplifying circuits since the signal may be made to override noise excursions in the circuitry.

The resultant altered wave form at point H is amplified by the output amplifier device 115 and this output will take the form shown in FIGURE 10H as well as FIGURE 8C.

Figure 11:
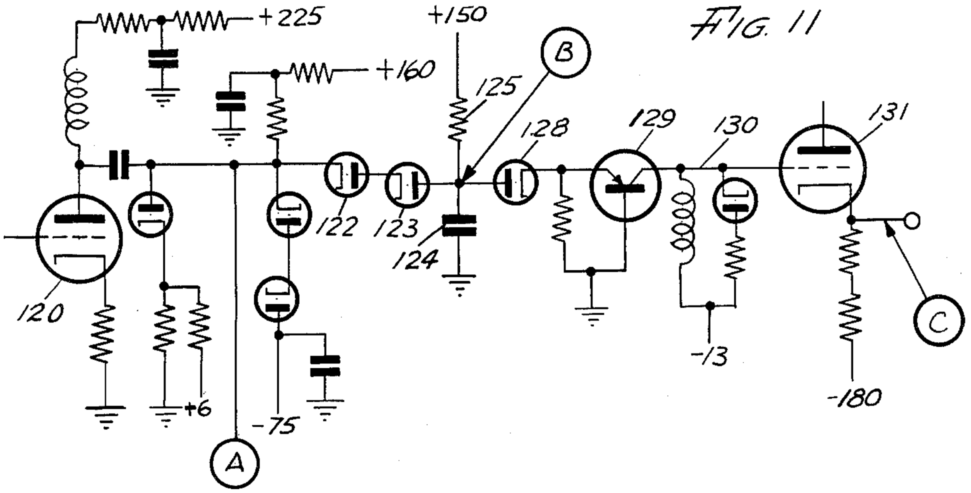
FIGURE 11 shows a schematic circuit of a time interval detector of the type used in FIGURE 7.

The output pulses from the crossover detector are used to supply the driving pulses for the shift register 83 and also to supply the input of the time detector 84 which is shown in schematic detail in FIGURE 11. Referring now to FIGURE 11, there is here shown an amplifying device 120 which is adapted to receive on the input thereof positive pulses from the output of the circuit 82. These positive pulses are amplified and inverted so that they appear on the output as a series of negative pulses as represented at A in FIGURE 12. The resultant output pulse is arranged to be clamped so that the resultant pulse swings between approximately 1 volt positive and 75 volts negative. The negative pulse on the output lead 121 is applied by way of the series diodes 122 and 123 to charge a condenser 124 negative. The negative charge will tend to leak off due to the connection of the condenser to a positive 150 volt source by way of the resistor 125. When the negative pulse charges the condenser 124, the voltage on the upper terminal thereof will be negative and will then begin to slowly charge in a manner set forth at B–1 in FIGURE 12. If another input pulse is received within a predetermined length of time before the terminal 126 has reached a positive potential, the circuit will again be charged so that the upper terminal of condenser 124 will be at its low potential. The condenser will again start to discharge and if a subsequent pulse is not received within the time constant of the circuit, the terminal 126 will charge to a point where it becomes positive as at B–2 at which time the diode 128 will conduct and apply a biasing signal to a transistor amplifier device 129. The output of the transistor amplifier 129 will be applied to a shaping circuit 130 and to the input of a further amplifying device 131 connected in a cathode follower configuration. The output of the cathode follower will be as indicated at C in FIGURE 12.

Figure 12:
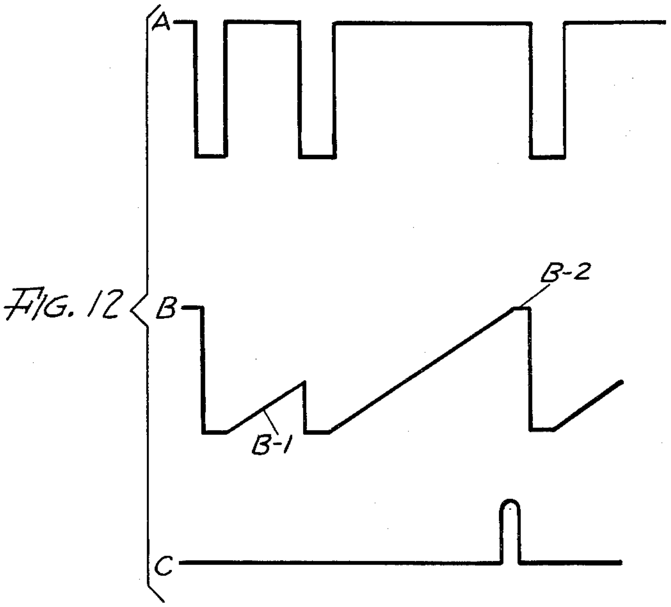
FIGURE 12 shows the wave forms associated with the circuit of the type shown in FIGURE 11.

It will be apparent from FIGURES 11 and 12 that the only output from the circuit will occur when the time interval between adjacent pulses has exceeded a predetermined amount. As described in the present invention, this time interval has been assumed to represent a binary "one." The binary "one" is then available for insertion into the shift register 83 shown in FIGURE 7 and from there may be shifted to the associated data processing machine.

It will be readily apparent from the foregoing description that there has been provided a new and improved apparatus involving a record formed with a new arrangement of the identifying indicia. Further, this record is adapted to be used directly when read without the necessity of external shifting means or synchronizing signals. Further, a method of recording the information permits a very efficient use of the record space and the resultant signal read from the tape will minimize the effects of any noise in the associated circuitry. It will further be apparent that the amount of information packed into a given time interval may be greatly increased by using the present techniques.

While in accordance with the provisions of the statutes, there has been illustrated and described the best form of the invention known, it will be apparent to those skilled in the art that changes may be made in the form of the apparatus disclosed without departing from the spirit of the invention as set forth in the appended claims, and that in some cases certain features of the invention may be used to advantage without a corresponding use of other features.

Having now described the invention, what is claimed as new and for which it is desired to secure by Letters Patent is:

1. In apparatus for recording binary data on a record medium, the combination comprising a recording device adapted when active to record on said record medium record indicia, a shift register adapted to store binary data, a single control circuit connected to the output of said shift register to receive signals therefrom, a timed pulse signal source having a recurring pulse output connected to said control circuit to produce in said circuit a shift pulse, means connecting said control circuit to said shift register to shift pulses into said control circuit, sensing means connected to the output of said shift register and responsive to an output pulse from said shift register and connected to said control circuit to inhibit the effect of the timed pulse signal source on said control circuit for one pulse period following the shift pulse, and means connecting said control circuit to said recording device to activate said recording device in accordance with the shift pulses in said control circuit.

2. Apparatus for recording binary digits on a moving magnetic tape comprising a magnetic recording head positioned adjacent to said magnetic tape, a control circuit connected to said recording head to supply a control signal of a predetermined repetition rate to said recording head so that said signal will be recorded on said magnetic tape, and a binary signal source having a selectively and randomly occurring binary signal output connected to said control circuit to selectively decrease the repetition rate of said control signal to a fraction of its normal predetermined value when a selected binary digit is supplied to said control circuit so that the signals on the output of said control circuit are variably time spaced relative to each other in accordance with the type of binary digit applied and each signal is common to two binary digits.

3. Apparatus for recording binary digits on a moving magnetic tape comprising a magnetic recording head positioned adjacent to said magnetic tape, a control circuit connected to said recording head to supply a signal of predetermined repetition rate to said recording head so that said signal will record two spaced magnetic indicia representing a binary digit on said magnetic tape for each cycle of said signal with each indicia forming an indicia for two adjacent binary digits, a binary signal source having a selectively and randomly occurring binary signal output connected to said control circuit, and means including said binary signal source when connected to said control circuit for decreasing the repetition rate of said signal to a fraction of its normal value in accordance with the presence of a selected binary digit.

4. Apparatus for reading recorded binary data from a record having a plurality of spaced record indicia thereon where selected indicia are arranged as a common indicia for two adjacent binary digits which may be of either type and the spacing between adjacent indicia is indicative of the selected binary digit type comprising an indicia reading means positioned adjacent said record, said reading means having an output signal indicative of the indicia positions as the record is moved relative to said reading means, circuit means connected to said reading means to produce signal pulses of a time displacement indicative of the indicia spacing on the record, a pulse time length sensing means connected to the output of said circuit means to produce an output pulse only upon the occurrence of a selected binary digit, a shift register adapted to store and move binary digits, means including said circuit means connected to shift the digits in said shift register, and means including said sensing means connected to the input of said shift register to supply the selected binary digit thereto.

5. An electrical apparatus for transferring binary data comprising a shift register having a plurality of storage positions, a binary signal source having characterized signals selectively indicative of binary "ones" and "zeroes," a circuit means having said binary signal source connected thereto and producing an output signal for each binary digit from said signal source, means connecting said output to said shift register to control the shifting of data therein between storage positions, and a binary digit sensing means connected on its input to said binary signal source and on its output to said shift register, said sensing means comprising a binary digit representation discriminator connected to produce an output only upon the occurrence of a selected binary digit.

6. An electrical apparatus for use with a magnetic recording of digital data which is characterized by a single magnetic mark forming a reference indicium for two adjacent bits of information either of which may be any selected combination of binary digits comprising a signal reading means positioned adjacent said recording to produce from said recording an alternating signal having a zero crossover for each magnetic mark, and circuit means comprising a zero cross-over detector circuit connected to said reading means to sense each crossover and produce a control pulse, each such pulse being indicative of a limit of at least two adjacent bits of digital data in said magnetic recording and where each digital data representation is defined by two adjacent control pulses.

7. Apparatus for reading recorded binary data from a record having a plurality of spaced record indicia thereon where selected indicia are arranged as a common indicia for two adjacent binary digits which are unrestricted as to the type of digit and the spacing between adjacent indicia is indicative of the selected binary digit type comprising an indicia reading means positioned adjacent said record, said reading means having an output signal formed as a series of pulses of like polarity each of which is indicative of each of the indicia positions as the record is moved relative to said reading means, and a signal converter connected to said reading means to convert said signal to pulses indicative of binary digits, said signal converter comprising means connected therein to sense a time displacement between each sequential ones of said pulses of said signal and produce an output pulse when the time displacement is of a predetermined amount.

8. A binary digit storage record comprising a magnetic record medium having serially recorded thereon a plurality of magnetic indicia each represented by a single change in the flux state of the record medium in variably spaced relation so that selected indicia which are immediately adjacent to each other are used for two adjacent binary digits which may be randomly occurring, each binary digit is represented by two adjacent indicia, and the distance between each two adjacent indicia of said selected indicia is indicative of a selected binary digit.

9. Apparatus for recording binary information on a recording medium comprising a recording means, said recording medium being adapted for relative movement with respect to said recording means, a binary digital signal source, said source having randomly and selectively occurring binary output signals, a clock signal source having uniformly time spaced output pulses, a signal converter having an input and an output, said converter comprising a gating means having said binary digital source and said clock signal source connected thereto, said gating means passing all of the clock pulses from said clock signal source when said binary digit input is of a first type, and means connected to said gating means to open said gating means to pass a fractional number of said clock pulses when said binary digit input is of a second type.

References Cited in the file of this patent

UNITED STATES PATENTS

| | | |
|---|---|---|
| 2,721,989 | Gates et al. | Oct. 25, 1955 |
| 2,743,320 | Daniels et al. | Apr. 24, 1956 |
| 2,796,596 | Kenosian | June 18, 1957 |
| 2,887,674 | Greene | May 19, 1959 |
| 2,890,440 | Burkhart | June 9, 1959 |

OTHER REFERENCES

"Techniques for Increasing Storage Density of Magnetic Drum Systems" (Fuller et al.), Proceedings of the Eastern Joint Computer Conference, December 8–10, 1954, pp. 16–21.